(12) United States Patent
Higashi

(10) Patent No.: US 7,724,310 B2
(45) Date of Patent: May 25, 2010

(54) HIGH DEFINITION TV

(76) Inventor: Norihiro Higashi, c/o Funai Electric Co., Ltd., 7-1, 7-chome Nakagaito, Daito-shi, Osaka (JP) 574-0013

( * ) Notice: Subject to any disclaimer, the term of this patent is extended or adjusted under 35 U.S.C. 154(b) by 1057 days.

(21) Appl. No.: 11/416,585

(22) Filed: May 3, 2006

(65) Prior Publication Data

US 2006/0256239 A1 Nov. 16, 2006

(30) Foreign Application Priority Data

May 10, 2005 (JP) ......................... 2005-003067 U

(51) Int. Cl.
*H04N 5/44* (2006.01)
*H04N 7/00* (2006.01)
*H04N 11/00* (2006.01)
*H04N 17/00* (2006.01)
*G06F 9/445* (2006.01)

(52) U.S. Cl. ................. 348/725; 348/177; 348/178; 348/180; 348/460; 348/461; 348/553; 348/563; 717/18

(58) Field of Classification Search ............. 348/177, 348/178, 180, 460, 461, 553, 563, 725; 725/50, 725/140, 152; 717/168
See application file for complete search history.

(56) References Cited

U.S. PATENT DOCUMENTS

| 5,003,591 | A  | * | 3/1991  | Kauffman et al. | 380/232 |
| 6,469,742 | B1 | * | 10/2002 | Trovato et al.  | 348/553 |
| 2002/0152467 | A1 | * | 10/2002 | Fiallos      | 725/50  |
| 2005/0120384 | A1 | * | 6/2005  | Stone et al. | 725/132 |
| 2005/0259948 | A1 | * | 11/2005 | Ando         | 386/46  |
| 2006/0001554 | A1 | * | 1/2006  | Morishita    | 341/50  |
| 2006/0164328 | A1 | * | 7/2006  | Jaff         | 345/2.3 |
| 2006/0184780 | A1 | * | 8/2006  | Yamada et al.| 713/1   |

FOREIGN PATENT DOCUMENTS

| JP | 64-027392   | 1/1989  |
| JP | 2001-078238 | 3/2001  |
| JP | 2001-346234 | 12/2001 |
| JP | 2003-348626 | 12/2003 |
| JP | 2005-102186 | 4/2005  |

* cited by examiner

*Primary Examiner*—Brian P Yenke

(57) ABSTRACT

The present invention discloses an HDTV, and a method for controlling adjustment of the HDTV, which make it possible to set control information of the HDTV easily at low cost without unpacking the TV set. Adjustment data is included in an INFO frame, transmitted from an external device, and written into a register of an HDMI receiver 14 through a video signal input terminal 13. Further, a microcomputer 15 reads the adjustment data and controls the adjustment of the HDTV 11 based on contents of the data.

6 Claims, 3 Drawing Sheets

HIGH DEFINITION TV

CROSS-REFERENCES TO RELATED APPLICATIONS

The present application is related to the Japanese Utility Model Application No. 2005-3067, filed May 10, 2005, the entire disclosure of which is expressly incorporated by reference herein.

BACKGROUND OF THE INVENTION

1. Field of the Invention

The present invention relates to High Definition Television (HDTV), and more particularly, to HDTVs in which various adjustments are made based on adjustment data.

2. Description of the Related Art

In general, HDTVs use digitized signal processing with a greater number of scanning lines (compared to conventional TVs) with insignificant loss in signal quality, generating high-definition video display.

HDTVs generally include a memory, with control information for displaying video signals, and a microcomputer for processing the video signals based on the control information within the memory. In general, the control information relates to display conditions, non-limiting examples of which may include brightness, hue, and contrast.

In general, all control information is pre-set to some standard as initial factory settings in a factor during the assembly of the HDTV, which can later be changed according to user preferences. Control information changes may also be required when the HDTV is repaired. During maintenance or repair work, a utility worker opens a case of the HDTV and unpacks a set of internal electronics etc. to do the maintenance work.

However, in unpacking the HDTV set, there have been a number of working steps required for analysis and adjustment. Also, due to such work itself might induce another error. Furthermore, due to such analysis and adjustment, additional adjusting equipment has been necessary, being one of the reasons for pushing up the cost.

The Japanese Patent Unexamined Publication No. 2001-346234 (Cited Document 1) discloses a construction in which a memory of the television receiver is updated by a signal-stopping circuit for stopping communication of a signal between a microcomputer and the memory, and a memory updating circuit comprising a conversion means for signals from a video input terminal and a conversion means for signals from an audio output terminal. With the construction shown in the cited document 1, it is not necessary to unpack the set. However, it is necessary to newly add a memory updating circuit even though it may be a simple one. Therefore, the construction shown in the cited document 1 cannot solve the problem of pushing up the cost.

On the other hand, Japanese Patent Unexamined Publication No. 64-27392 (Cited Document 2) discloses a technology, in the inspection of a display, wherein control data of the internal electronics is shown on the display so that a user can make sure that the operation and what is shown on the display correspond to each other. The construction of the cited document 2 can reduce the burden on the worker. However, it is still necessary to unpack the set and the problems accompanying such a process cannot be solved.

SUMMARY OF THE INVENTION

The present invention is made in view of the above to provide an HDTV wherein maintenance work that requires setting of control information of the HDTV can be done easily at low cost without opening the case of the HDTV, and unpacking of internal electronics etc.

One aspect of the present invention provides an HDTV having a video signal input terminal through which a video signal from an external device is inputted, the HDTV comprising:

the video signal input terminal conforming to the HDMI standard;

an HDMI receiver for receiving a video signal of the TMDS system inputted through the video signal input terminal from an external device and outputting the received video signal to a video processor; and a microcomputer for controlling the HDMI receiver, wherein adjustment data having information for adjustment used during an adjusting process is encoded, included in an INFO frame of the TMDS system, and transmitted from the external device;

wherein video data of adjustment contents is encoded and transmitted to a video frame of the TMDS system from the external device;

wherein the adjustment data and video data are written into a register of the HDMI receiver through the video signal input terminal; and wherein the microcomputer reads the adjustment data of the INFO frame written into the register of the HDMI receiver and controls adjustment of the HDTV based on the contents of the data and, further, the microcomputer reads the video data for adjustment in the video frame written into the register of the HDMI receiver and shows a video picture on a display, thereby making it unnecessary to unpack the HDTV set as well as making it easier to check the adjustment contents during the adjusting process.

According to the present invention constructed as above, the adjustment data is inputted to the register of the HDMI receiver by the INFO frame through the video signal input terminal from the external device, the adjustment data in the INFO frame is read by the microcomputer, and the adjustment of the HDTV is controlled.

Further, the video data of adjustment contents is inputted to the register of the HDMI receiver by the video frame through the video signal input terminal from the external device, the video data for adjustment in the video frame is read by the microcomputer, and a video picture is shown on a display of the HDTV.

According to the present invention, the HDTV set doesn't have to be unpacked and the maintenance work which requires the setting of the HDTV's control information can be done easily at low cost.

Further, contents of adjustment can be confirmed and the maintenance work which requires the setting of the HDTV's control information can be done more easily by inputting the video data of adjustment contents to the register of the HDMI receiver by the video frame through the video signal input terminal from the external device, reading the video data for adjustment in the video frame by the microcomputer, and showing the video picture on the display of the HDTV.

Another aspect of the present invention provides an HDTV having a video signal input terminal through which a video signal from an external device is inputted, the HDTV comprising:

the video signal input terminal conforming to the HDMI standard;

an HDMI receiver for receiving a video signal of the TMDS system inputted through the video signal input terminal from the external device and outputting the received video signal to a video processor; and a microcomputer for controlling the HDMI receiver, wherein adjustment data having information for adjustment used during an adjusting process is encoded, included in an INFO frame of the TMDS system, and transmitted from the external device;

wherein the adjustment data is written into a register of the HDMI receiver through the video signal input terminal; and wherein the microcomputer reads the adjustment data of the INFO frame written into the register of the HDMI receiver and controls adjustment of the HDTV based on the contents of the data.

According to the present invention constructed as above, the adjustment data is inputted to the register of the HDMI receiver by the INFO frame through the video signal input terminal from the external device, the adjustment data in the INFO frame is read by the microcomputer, and the adjustment of the HDTV is controlled.

According to the present invention, the HDTV set doesn't have to be unpacked and the maintenance work which requires the setting of the HDTV's control information can be done easily at low cost by inputting the adjustment data to the register of the HDMI receiver by the INFO frame through the video signal input terminal from the external device, reading the adjustment data in the INFO frame by the microcomputer, and controlling the adjustment of the HDTV.

An optional aspect of the present invention provides an HDTV wherein adjustment data having information for adjustment used during an adjusting process is encoded, included in an INFO frame of the TMDS system, and transmitted from an external device;

wherein video data of adjustment contents is encoded and transmitted to a video frame of the TMDS system from the external device;

wherein the adjustment data and video data are written into a register of the HDMI receiver through the video signal input terminal; and wherein the microcomputer reads the adjustment data of the INFO frame written into the register of the HDMI receiver and controls adjustment of the HDTV based on the contents of the data and, further, the microcomputer reads the video data for adjustment in the video frame written into the register of the HDMI receiver and shows a video picture on a display, thereby making it unnecessary to unpack the HDTV set as well as making it easier to check the adjustment contents during the adjusting process.

According to the present invention constructed as above, as described earlier, the adjustment data is inputted to the register of the HDMI receiver by the INFO frame through the video signal input terminal from the external device, the adjustment data in the INFO frame is read by the microcomputer, and the adjustment of the HDTV is controlled.

Further, the video data of the adjustment contents is inputted to the register of the HDMI receiver by the video frame through the video signal input terminal from the external device, the video data for adjustment in the video frame is read by the microcomputer, and the video picture is shown on the display of the HDTV.

According to the present invention, the HDTV set doesn't have to be unpacked and the maintenance work which requires the setting of the HDTV's control information can be done easily at low cost.

Further, the contents of adjustment can be confirmed and the maintenance work which requires the setting of the HDTV's control information can be done more easily by inputting the video data of the adjustment contents to the register of the HDMI receiver by the video frame through the video signal input terminal from the external device, reading the video data for adjustment in the video frame by the microcomputer, and showing the video picture on the display of the HDTV.

Thus, there is provided an HDTV and a method for controlling the adjustment of the HDTV wherein maintenance work which requires the setting of control information of the HDTV can be done easily at low cost without opening the case of the HDTV and unpacking a set of internal electronics etc.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers.

Figure 1:
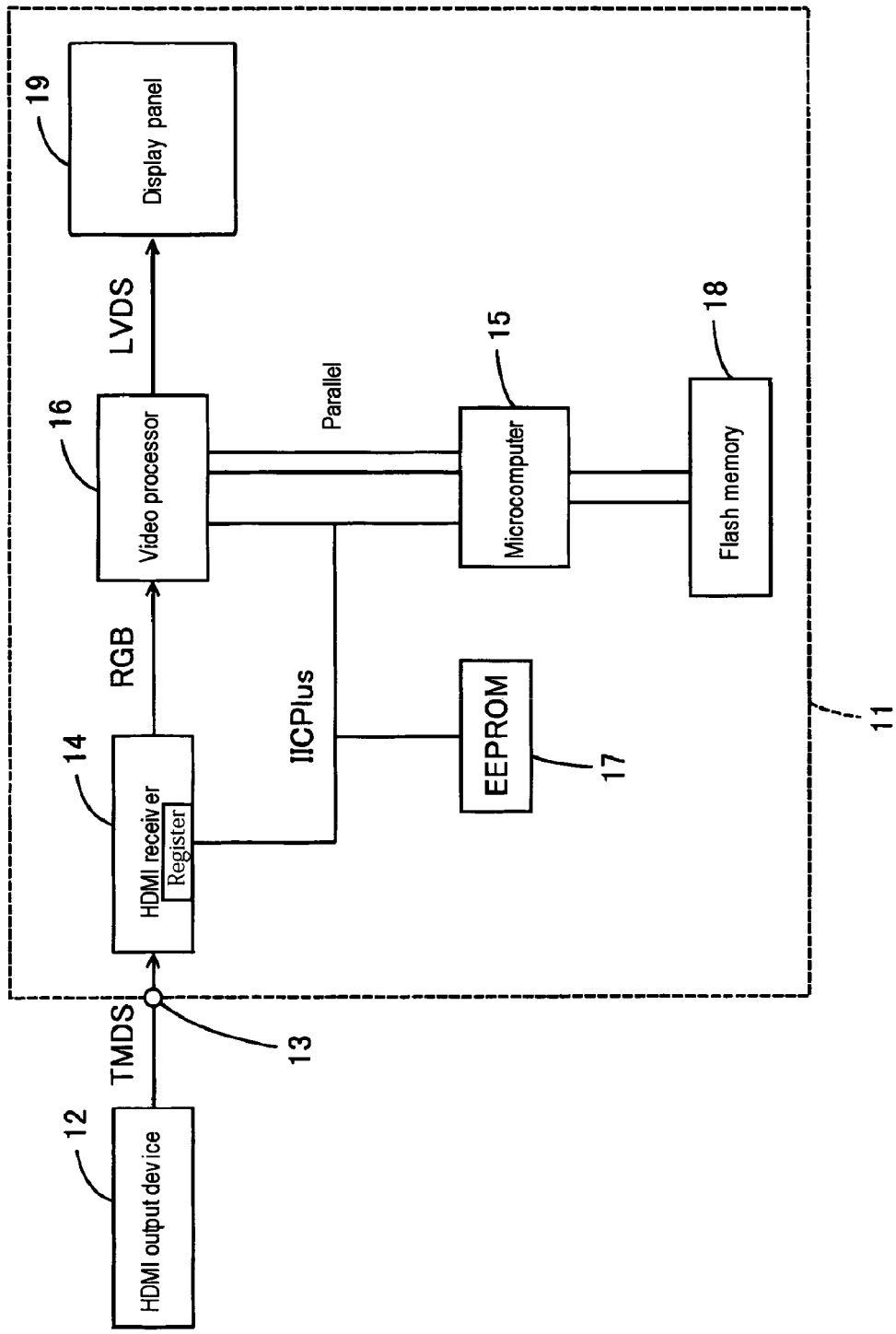
FIG. 1 is an exemplary schematic block diagram illustration of an HDTV in accordance with the present invention.

FIG. 1 is a schematic block diagram, illustrating the HDTV 11 whose control information is to be set and adjusted. The HDTV 11 has a video signal input terminal 13 through which a video signal from an external device is inputted pursuant to the High Definition Multimedia Interface (HDMI) standard. The HDMI standard is a next-generation digital audio/visual interface standard based on Digital Visual Interface (DVI) with quite a few functions added for home electric appliances while maintaining downward compatibility. In addition to video signals, it can send audio signals with high quality and control signals for remote control etc.

The HDTV 11 comprises an HDMI receiver 14 for receiving a video signal encoded according to the Transition Minimized Differential Signaling (TMDS) system by an HDMI output device 12 provided externally through the video signal input terminal 13 and outputting the received video signal to a video processor 16 and a microcomputer 15 for controlling the HDMI receiver 14. The video processor 16 outputs a video picture as an LVDS (Low Voltage Differential Signal)

signal under the LVDS standard and a display panel 19 receives the LVDS signal and displays the video picture.

The microcomputer 15 is connected with the video processor 16 through a parallel bus and, based on control information in an EEPROM 17 and flash memory 18 sequentially read out, controls the video processor 16 so that the video processor 16 will output and shows the video picture on the display panel 19. Further, the microcomputer 15, the video processor 16, and the EEPROM 17 are connected to one another through an IIC(Inter IC bus Controller) (PLUS) bus. Also, the flash memory 18 is connected to the microcomputer 15.

The HDTV 11 sends and receives data digitally. The digital data is sent and received by a frame, and data in video frames are used for video reproduction and data in audio frames are used for audio reproduction, respectively. In addition to the video frame and the audio frame, there is one called an "INFO frame." The INFO frame contains data other than video and audio data.

Figure 2:
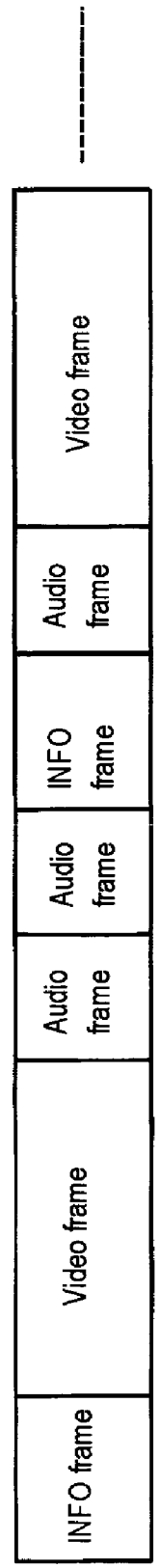
FIG. 2 is an exemplary illustration of data format, showing the state of transfer of video, audio, and INFO data in a respective video, audio, and INOF frame, in accordance with the present invention.

FIG. 2 schematically shows the state of transfer of video data in the video frame, audio data in the audio frame, and data in the INFO frame. Namely, data in the INFO frame is always transferred together with the video data and audio data. However, the data in the INFO frame does not change when there is no change in the contents of the video data in the video frame or the audio data in the audio frame. Accordingly, when there is no change in the contents of the video data or audio data, the INFO-frame data is, in fact, unnecessarily transferred. The present invention uses the INFO-frame data, which may have been unnecessarily transferred. That is, adjustment data used during the adjusting process of the HDTV 11 is written into the INFO frame and transmitted.

Figure 3:
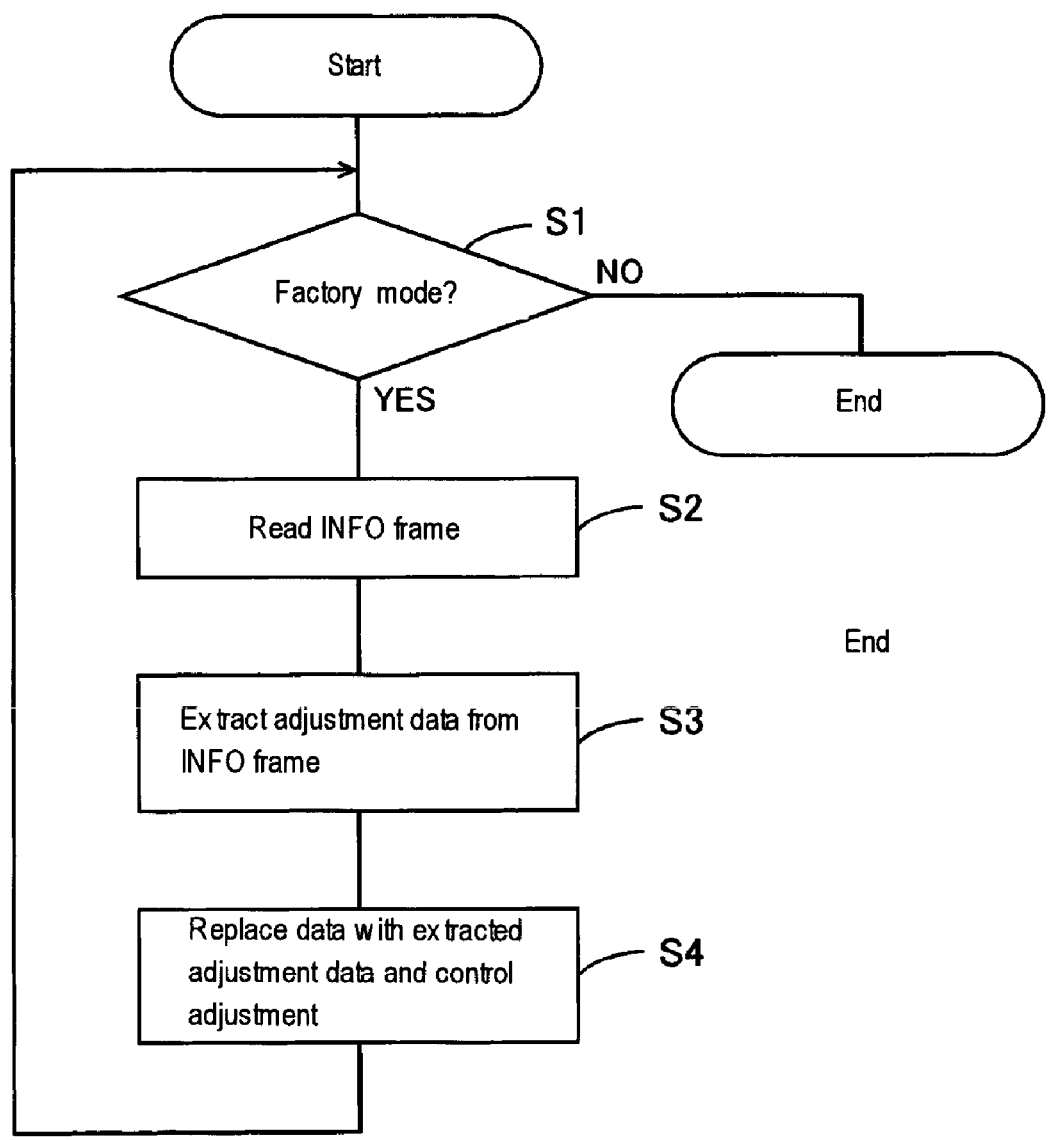
FIG. 3 is an exemplary flowchart, illustrating the operation of an adjusting process in accordance with the present invention.

FIG. 3 is an exemplary flowchart, illustrating the operation of an adjusting process in accordance with the present invention. For adjustments, the setting of the HDTV 11 is changed from a normal mode for viewing, to a factory mode for adjusting. The HDMI output device 12 sends the adjustment data encoded according to the TMDS system in the INFO frame. On the part of HDTV 11, in the operational act S1, it is determined whether the setting is changed to the factory mode. If the HDTV 11 is in the factory mode, the INFO frame containing the adjustment data is inputted by the HDMI receiver 14 through the video signal input terminal 13 and is written into the register.

In the operational act of S2, the microcomputer 15 reads the INFO frame written into the register of the HDMI receiver 14, and in operational act S3, the microcomputer 15 extracts the adjustment data from the INFO frame. In the operational act S4, the microcomputer 15 replaces the initial adjustment data stored in the EEPROM 17 and flash memory 18 with the new adjustment data extracted in the operational act S3, and controls adjustment. Thereafter, the setting is changed from the factory mode to the normal mode, and the adjusting process is completed.

Non-limiting examples of adjustment data may include shades of color of a picture, updating of memory, control of sound, etc. As described above, in the present embodiment, the adjustment data for the adjusting process stored in the INFO frame is inputted through the video signal input terminal 13, which the HDTV 11 is originally equipped with. Therefore, during the adjusting process, the set of HDTV 11 does not have to be unpacked and the maintenance work can be performed easily at low cost. In addition, since the INFO frame, which is virtually unnecessary when there is no change in the video and audio data, is made use of, there is no additional adjusting circuit or adjusting device needed, which further reduce the overall cost of what.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, along with the storing of the adjustment data into the INFO frame in the present embodiment, video data of the adjustment contents may be encoded and transmitted from the external device in a video frame of the TMDS system. With this construction, since the adjustment contents are shown on a display panel, a worker can check such adjustment contents, enabling the adjusting process to be far easier. The display system of the HDTV is not limited to a particular system, and various systems such as the ones using a PDP, a liquid crystal display, a CRT, etc. are applicable. It is needless to say that the present invention can be provided not only as a construction of the HDTV described above but also as a method of controlling adjustment of the HDTV with the similar construction. Such variations and alternate embodiments are contemplated, and can be made without departing from the spirit and scope of the invention.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

What is claimed is:

1. An HDTV having a video signal input terminal through which a video signal from an external device is inputted, the HDTV comprising:

the video signal input terminal conforming to the HDMI standard;

an HDMI receiver for receiving a video signal of the TMDS system inputted through the video signal input terminal from the external device and outputting the received video signal to a video processor; and a microcomputer for controlling the HDMI receiver, wherein adjustment data having information for adjustment used during an adjusting process is encoded, included in an INFO frame of the TMDS system, and transmitted from the external device;

wherein video data of adjustment contents is encoded and transmitted to a video frame of the TMDS system from the external device;

wherein the adjustment data and video data are written into a register of the HDMI receiver through the video signal input terminal; and wherein the microcomputer reads the adjustment data of the INFO frame written into the register of the HDMI receiver and controls adjustment of the HDTV based on the contents of the data and, further, the microcomputer reads the video data for adjustment in the video frame written into the register of the HDMI receiver and shows a video picture on a display, thereby making it unnecessary to unpack the HDTV set as well as making it easier to check the adjustment contents during the adjusting process.

2. An HDTV having a video signal input terminal through which a video signal from an external device is inputted, the HDTV comprising:

the video signal input terminal conforming to the HDMI standard;

an HDMI receiver for receiving a video signal of the TMDS system inputted through the video signal input terminal from the external device and outputting the received video signal to a video processor; and a microcomputer for controlling the HDMI receiver, wherein adjustment data having information for adjustment used during an adjusting process is encoded, included in an INFO frame of the TMDS system, and transmitted from the external device;

wherein the adjustment data is written into a register of the HDMI receiver through the video signal input terminal;

wherein the microcomputer reads the adjustment data of the INFO frame written into the register of the HDMI receiver and controls adjustment of the HDTV based on the contents of the data;

video data of adjustment contents is encoded, included in a video frame of the TMDS system, and transmitted from the external device;

the adjustment data and video data are written into a register of the HDMI receiver through the video signal input terminal; and the microcomputer reads the adjustment data of the INFO frame written into the register of the HDMI receiver and controls adjustment of the HDTV based on the contents of the data and, further, the microcomputer reads the video data for adjustment in the video frame written into the register of the HDMI receiver and shows a video picture on a display, thereby making it unnecessary to unpack the HDTV set as well as making it easier to check the adjustment contents during the adjusting process.

3. An HDTV having a video signal input terminal through which a video signal from an external device is inputted as set forth in claim 2, comprising:

a video signal input terminal through which a video signal from an external HDMI output device is inputted under the HDMI standard;

a video processor for receiving a video signal encoded according to the TMDS system through the video signal input terminal;

a microcomputer for controlling the HDMI receiver; and a display panel on which a video picture is shown according to an LVDS signal outputted from the video processor.

4. An HDTV having a video signal input terminal through which a video signal from an external device is inputted as set forth in claim 3, wherein:

the microcomputer is connected to the HDMI receiver and the video processor through an IIC bus;

an EEPROM is connected to the IIC bus; and flash memory is connected to the microcomputer.

5. An HDTV having a video signal input terminal through which a video signal from an external device is inputted as set forth in claim 4, wherein:

the microcomputer is connected with the video processor through a parallel bus; and based on control information which is stored in the EEPROM and the flash memory and read in sequence, the microcomputer controls the video processor so that the video processor will output and show a video picture on the display panel.

6. A method for controlling adjustment of a HDTV comprising:

setting the HDTV to a mode for adjustment;

encoding adjustment contents data having information for adjustment that is used during an adjusting process;

encoding video data of adjustment contents data for display of adjustment contents data during the adjusting process;

including the encoded adjustment contents data and the video data of adjustment contents data into an INFO frame of a TMDS system;

transmitting the INFO frame from an external device to the HDTV;

storing the transmitted adjustment contents data and video data of the adjustment contents data into a register of a HDMI receiver through a video signal input terminal of the HDTV via the TMDS system;

extracting the adjustment contents data and the video data of the adjustment contents data of the INFO frame from the register of the HDMI receiver;

replacing an initial adjustment contents data stored within HDTV with the extracted adjustment contents data;

controlling adjustment of the HDTV based on contents of the extracted adjustment contents data and displaying a video of the adjustments based on the extracted video data of the adjustment contents data to view and check the adjustments contents data during the adjusting process.

* * * * *